United States Patent [19]
Meli

[11] Patent Number: 5,677,786
[45] Date of Patent: Oct. 14, 1997

[54] DEVICE FOR REDUCING THE OPTICAL NOISE DUE TO FOUR WAVE MIXING

[75] Inventor: Fausto Meli, Piacenza, Italy

[73] Assignee: Pirelli Cavi S.p.A., Italy

[21] Appl. No.: 672,573

[22] Filed: Jun. 28, 1996

[30] Foreign Application Priority Data

Jul. 14, 1995 [IT] Italy ................... MI95A1536

[51] Int. Cl.⁶ .................................. H01S 3/00
[52] U.S. Cl. .......................... 359/341; 359/124
[58] Field of Search ..................... 359/341, 337, 359/124, 161, 176

[56] References Cited

U.S. PATENT DOCUMENTS

| | | | |
|---|---|---|---|
| 5,392,154 | 2/1995 | Chang et al. | 359/341 |
| 5,452,116 | 9/1995 | Kirkby et al. | 359/124 |
| 5,539,563 | 7/1996 | Park | 359/161 |
| 5,546,210 | 8/1996 | Chraplyvy et al. | 359/124 |

FOREIGN PATENT DOCUMENTS

| | | | |
|---|---|---|---|
| 2161612 | 1/1986 | United Kingdom | H04B 9/00 |
| 2281670 | 3/1995 | United Kingdom | H04B 10/12 |

OTHER PUBLICATIONS

Journal of Lightwave Technology, vol. 11 No. 3, Mar. 1993 pp. 455–461.
Patent Abstracts of Japan —vol. 18, No. 84 (E–1506), 1994.

Primary Examiner—Mark Hellner
Attorney, Agent, or Firm—Brooks Haidt Haffner & Delahunty

[57] ABSTRACT

An optical telecommunication system includes at least two sources of optical signals modulated at different wavelengths, having respective coherence times; a multiplexer for multiplexing said signals in a single common optical fibre; an optical-fibre line connected at one end to the common optical fibre of the multiplexer; a receiver for receiving said signals; an element for reducing the four wave mixing (FWM) between the signals, optically connected in series along the optical-fibre line. The FWM-reducing element includes an optical circuit including at least two-wavelength-selective filters, each relative to a wavelength band including one of the optical signals. The filters are optically connected in series with each other over an optical path, and the length of at least one section of the optical path included between two consecutive filters is greater than the length corresponding to the coherence time of at least one of the sources of optical signals.

19 Claims, 10 Drawing Sheets

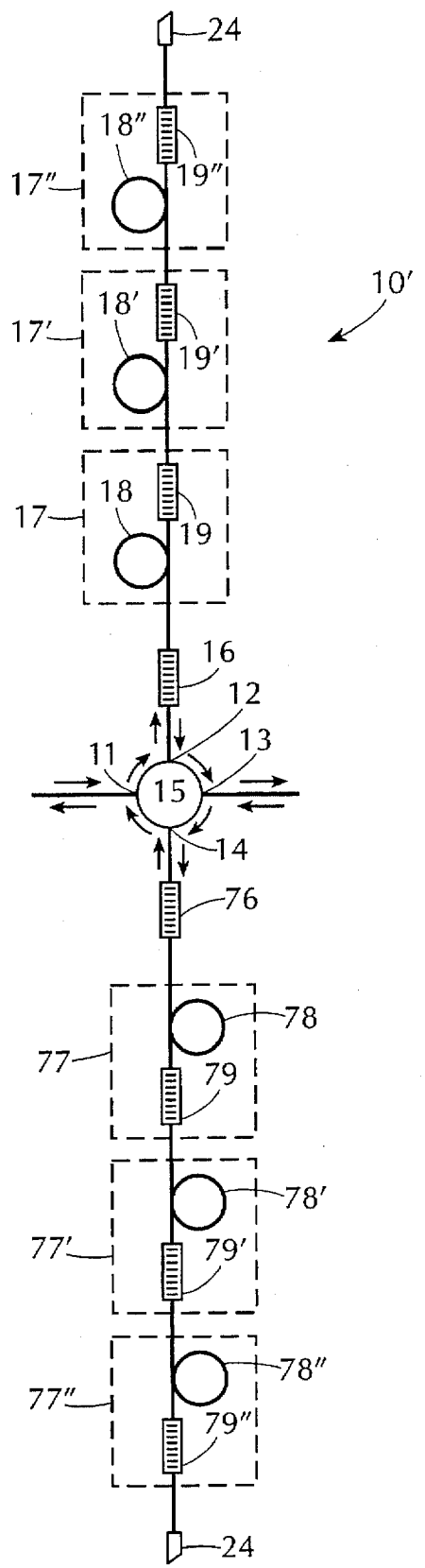

1

DEVICE FOR REDUCING THE OPTICAL NOISE DUE TO FOUR WAVE MIXING

FIELD OF THE INVENTION

The present invention relates to an optical circuit for reducing the optical noise resulting from four wave interaction between optical signals along an optical communication line, an optical amplifier comprising such a circuit for reducing the four wave interaction, an optical communication system having a reduced level of noise due to four wave interaction, comprising a transmission line with cascade amplifiers, and a process for transmitting optical signals having a reduced level of noise due to four wave interaction.

BACKGROUND

Four wave interaction, also known as four photon interaction or four wave mixing (FWM), is a non-linear third-order phenomenon involving generation of a new signal starting from the interaction between three existing signals. The frequency $f_F$ of the new generated signal is bound to the frequencies $f_i$, $f_j$, $f_k$ of the interacting signals from the relation:

$$f_F = f_i + f_j - f_k.$$

The greatest efficiency in generating the new signal, or fourth wave, occurs when the polarizations of the interacting signals are in alignment, being at the same time the phase-concordance condition verified $$\Delta\beta = \beta(f_i) + \beta(f_j) - \beta(f_k) - \beta(f_F) = 0$$

wherein $\beta(f)$ is the propagation constant of the signal at frequency f.

The interacting signals are not necessarily three separated signals. The four wave mixing can also take place as an interaction between signals from two sources (degenerate case). In the presence of only two interacting signals at frequencies $f_i$ and $f_k$, for example, signals of frequencies $f_F = 2 \cdot f_i - f_k$ and $f_F = 2 \cdot f_k - f_i$ can be produced.

The four wave mixing is an obstacle for optical fibre communications employing the wavelength division multiplexing (or WDM) technique. According to this technique several communication channels independent of each other and each associated with a specific wavelength, are simultaneously transmitted over a communication line usually consisting of an optical fibre.

Due to the above nonlinear third-order phenomena, in the presence of a high radiation intensity in the fibre core (particularly in the presence of amplification) and great interaction lengths between the signals, generation of signals by effect of the intermodulation between signal pairs or triplets due to FWM may take place. Such a phenomenon is for example described in Journal of Lightwave Technology, vol. 8, No. 9, September 1990, pages 1402–1408.

The wavelengths of the generated signals can fall within the band employed for the communication channels and in particular may be coinciding with, or very close to the wavelength of one of the channels. The likelihood of this occurrence rapidly grows as the number of channels employed for the communication increases.

It is known that luminous signals sent over an optical fibre line undergo an attenuation on their way, which makes it necessary to carry out amplifications by means of related amplifiers located at predetermined intervals along the line.

For the purpose, optical amplifiers are conveniently used by which the signal is amplified while remaining in an optical form, that is in the absence of detection and regeneration of same. Said optical amplifiers are based on the properties of a fluorescent dopant such as erbium which, if suitably excited by administration of luminous pumping energy, exhibits a high emission in the wavelength band corresponding to the minimum attenuation of light in the silica-based optical fibres.

In the case of a multistage communication line with optical cascade amplifiers, signals generated by four wave mixing in each stage, amplified in the same way as the communication signals, are added to the signals generated by four wave mixing in the other stages and help in creating a crosstalk between the different channels. At the end of the line the signals produced by four wave mixing in each of the stages are added together. If the individual FWM signals have a high phase overlapping, the overall FWM signals resulting from the sum can be of such an intensity as to impair a correct reception of the communication signals.

The optical fibres used along the communication line have a chromatic dispersion resulting from the combination of features related to the refractive-index profile and the material constituting said fibres, which dispersion varies with the wavelength variations in the transmitted signal and becomes zero at a given value $\lambda_0$ of said wavelength.

This chromatic-dispersion phenomenon substantially consists of a duration extension in the signal-forming pulses while they are travelling along the fibre, which extension is due to the fact that in each pulse the different chromatic components each characterized by their own wavelength, travel along the fibre at different speeds.

Following this extension, pulses succeeding in time and well distinct at the emission time can come to a partial overlapping on reception, after their travel along the fibre and be no longer distinguishable as a separate entity, thereby causing a reception error.

The so-called dispersion shifted (DS) fibres are known, the optical features of which are such planned as to bring the chromatic-dispersion cancelling point to a wavelength included between 1500 and 1600 nm, commonly employed for telecommunications.

Fibres of this kind are defined in the Recommendation ITU-T G.653 of March 1993, in which the chromatic dispersion in the fibre is provided to nominally become zero at a wavelength value $\lambda_0$ of 1550 nm, with a 50 nm allowance based on the above value.

DS fibres are described for example in U.S. Pat. Nos. 4,715,679, 4,822,399, 4,755,022 and commercialized by CORNING Inc., Corning, N.Y. (US) under the trade name SMF/DS (Registered Trademark) and by FIBRE OTTICHE SUD S.p.A., Battipaglia (IT) under the trade name SM DS.

In particular, it has been noted that the above defined phase-concordance condition $\Delta\beta=0$ is verified and the FWM-generated signals are of great intensity, if the wavelength of one of the communication signals is coinciding with, or close to the wavelength $\lambda_0$ at which the fibre dispersion becomes zero, or if the wavelengths of two communication signals are disposed symmetrically to $\lambda_0$.

A technique suggested for obviating the problem of noise from FWM by intermodulation between signals in multichannel systems, described in IEEE Photonics Technology Letters, vol. 3, No. 6, June 1991, pages 560–563, consists in using communication signals having different polarizations from one another. This technique is very complicated since it is necessary to align the polarization in each input signal with the communication line. Its efficiency is also further restricted in that the optical fibres commonly used do not transmit the signal polarization unchanged.

In article FC4 issued in OFC/IOOC '93 Technical Digest, pages 252-253, the use of optical frequencies not spaced apart the same distance is suggested for the communication channels. These frequencies are such selected that the signals generated by four wave mixing between possible communication signal pairs or triplets have frequencies sufficiently far away from those of the communication signals so that they can be separated from the latter by filters. This technique however, involves an important underutilization (as compared with the case of equidistant channels) of the frequency (or wavelength) band available for communication. In addition, a high stability in the signal wavelength is required, which makes it necessary to use additional devices for controlling said stability.

A nonuniform spacing between the channel wavelengths in an optical WDM communication system is also suggested in U.S. Pat. No. 5,410,624 in the name of P. R. Morkel, in order to reduce the FWM effects, in combination with means for spectral regeneration of optical signals comprising an optical circulator and a chaining of fibre gratings having a narrow-band reflection, each tuned on one of the multiplexed wavelengths where said chaining is connected to the intermediate port of the optical circulator.

A third technique, disclosed in Electronics Letters, vol. 30, No. 11, 26/05/95, pages 876-878, consists in utilizing for the communication line, optical fibre portions having a dispersion which has a small absolute value and alternately takes positive and negative values. Where this technique is utilized, the already existing communication lines cannot be employed and new lines are to be arranged. In addition, accomplishment of the required new lines is difficult, in that a post-production selection is necessary in order to get optical fibres having dispersion features suited for use on the different portions, taking into account the difficulties encountered in directly producing fibres having constant dispersion features within the limits of the required accuracy.

A different kind of solution is disclosed in an article by K. Inoue issued in the review Journal of Lightwave Technology of March 1993, vol. 11, No. 3, pages 455-461. It is therein provided that the relation between the phases of the FWM-generated signals along the different stages of the multichannel communication line be made random, so as to prevent the channels from adding together in phase.

For making the relation between the phases random, the use of an optical circuit is suggested, which circuit is connected immediately upstream or downstream of each amplifier, along a communication line consisting of M portions of optical fibre and (M - 1) line amplifiers.

The optical circuit is comprised of a demultiplexer adapted to separate the communication signals, depending on frequency, over optical paths of different length, and a multiplexer adapted to recombine the optical signals towards a single output. The optical paths connecting the demultiplexer outputs with the multiplexer inputs are such selected that the difference between the lengths of any two of them is higher than the coherence length $L_c=v/\pi\Delta v$ of the source of the transmitted signals, wherein v is the light speed through the medium and $\Delta v$ is the line width of the communication signal source. Signals generated in each of the stages by effect of four wave mixing are uncorrelated from each other and therefore they add up at the end of the line depending on powers, instead of on amplitudes, as it occurs in conventional systems. Under phase-concordance conditions ($\Delta\beta=0$) the overall power of the FWM-produced radiation along a transmission line provided with the optical circuit is reduced, as compared with the case in which the optical circuit is absent, by a factor corresponding to the number of the optical fibre portions in the line.

The above mentioned article states that the described technique can be applied to multichannel optical communication systems in which the individual communication channels are withdrawn from the transmission line by demultiplexing the channels of different wavelengths over different optical paths, connecting the channel intended for withdrawal to a receiver, and multiplexing the remaining channels again over a common path.

The article rules out the possibility that the described technique may be immediately applied to multichannel optical communication systems equipped with demultiplexers capable of selecting individual channels from the line, while the other channels are continuing their travel over a common optical path. By way of example as demultiplexers of this type, those using a Fabry-Perot filter combined with an optical circulator are mentioned.

The Applicant could observe however that the optical circuit proposed in the article for reducing the four wave mixing and in particular the demultiplexers necessary to separate the signals at different wavelengths are of difficult practical accomplishment, above all in the presence of a high number of channels. The possible solution of disposing several demultiplexers in cascade with a lower number of outputs would make the device more complicated, bulkier and subjected to different attenuations for the different channels.

A substantial bulkiness could also result from the great overall length of the optical fibre portions connecting the multiplexer and demultiplexer, above all in the case of a great number of communication channels. In fact, since the fibre necessary for channel n must be at least as long as n times the coherence length of the radiation source, the sum of the lengths of these portions is at least N;(N+1)/2 times the coherence length, wherein N is the overall number of the communication channels.

In addition, a circuit constructed following the teachings of the above article cannot be given a new configuration, when one or more channels need to be added or changes in the wavelength of one or more channels are to be made. In this case the replacement of the demultiplexer and multiplexer is made necessary.

U.S. Pat. No. 5,283,686 in the name of D. R. Huber discloses, among other things, a WDM optical communication system comprising an optical amplifier, an optical circulator and Bragg-grating optical fibre filters, one for each communication channel used. The system enables the elimination of the spontaneous emission at wavelengths different from those of the communication channel. The patent does not mention the problem of the noise generated by four wave mixing along the communication line.

The Patent Application MI94A002556 filed on Dec. 16, 1994 in the name of the assignee of this application, relates, among other things, to an optical telecommunication system comprising:

at least two sources of optical signals modulated at different wavelengths, included in a predetermined transmission-wavelength band, at a predetermined transmission speed;

means for multiplexing said signals for input to a single optical fibre;

an optical-fibre line connected at one end to said multiplexing means;

means for receiving said signals, comprising optical demultiplexing means for the signals themselves, depending on the respective wavelength;

wherein said signals have an optical power of a value greater than a predetermined value in at least one portion of said optical fibre line, which line comprises an optical fibre having a chromatic dispersion value lower than a predetermined value in said transmission wavelength band, characterized in that said optical fibre has a chromatic dispersion increasing with the wavelength increase, exhibiting a zero value at a wavelength lower than the minimum wavelength of said band by such an amount that no local dispersion-cancelling wavelength value which is present in the fibre and is capable of generating a four wave mixing phenomenon is included in said band.

The problem arises of practically making an optical device capable of reducing the power of the radiation due to four wave mixing between the signals propagating along a communication line and in which the use of optical fibres different from common DS fibres is not required along the communication line.

SUMMARY OF THE INVENTION

According to one aspect, the present invention relates to an optical telecommunication system comprising:

at least two sources of optical signals modulated at different wavelengths, having respective coherence times;

a multiplexer for multiplexing said signals in a single common optical fibre;

an optical fibre line connected at one end to said common optical fibre of said multiplexer;

means for receiving said signals, connected to a second end of said optical fibre line and including a demultiplexer for said optical signals;

an element for reducing the four wave mixing between said signals, optically connected in series along said optical fibre line;

in which said FWM-reducing element comprises an optical circuit including at least two wavelength-selective filters, each relative to a wavelength band including one of said optical signals, said filters being optically connected in series with each other over an optical path, the length of at least one section of said optical path included between two consecutive filters being greater than the length corresponding to the coherence time of at least one of said sources of optical signals.

Preferably said optical circuit, for each of said optical signals comprises a wavelength-selective filter relative to a wavelength band including the corresponding optical signal and excluding the remaining optical signals, said filters being optically connected in series with each other over an optical path, the length of the sections of said optical path included between two consecutive filters being greater than the length corresponding to the coherence time of each of said sources of optical signals.

In particular, said optical circuit comprises an optical circulator having an input port and an output port connected with said optical fibre line and at least one input/output port connected to one of said wavelength-selective filters.

In particular said wavelength-selective filters are Bragg-grating filters, in particular made of optical fibre.

In one embodiment, disposed along said optical fibre line is at least one optical amplifier which advantageously comprises one active optical fibre doped with a fluorescent dopant, in particular Erbium, and a source of pump radiation.

Said FWM-reducing element can advantageously be optically connected in series at an intermediate position along said active optical fibre.

In this case an optical travel path for the pumping radiation external of said FWM-reducing element can be provided between the two portions into which said active optical fibre is divided by said element.

Alternatively, said optical amplifier may comprise two active optical fibre portions, each provided with a source of pump radiation.

In particular, the length of said active optical fibre portions, the fluorescent-dopant concentration in the active optical fibre and the pumping-source power are operatively selected in such a manner that the overall gain of said amplifier differs by less than 2 dB from the gain of the same amplifier devoid of said FWM-reducing element, so that the optical continuity between the two active optical fibre portions is restored.

According to a second aspect, the present invention relates to a process for transmitting optical signals comprising:

generating two modulated optical signals having respective wavelengths;

multiplexing said signals at one end of an optical transmission line comprising at least one single-mode optical fibre portion within which intermodulation by four wave mixing between the signals is generated;

receiving said signals at a second end of said optical transmission line, and comprising the operation of selectively delaying said signals at an intermediate position along said optical transmission line, wherein said selective-delaying operation comprises:

selectively sending said signals to respective optical paths of predetermined lengths, which lengths are adapted to phase-uncorrelate said signals from each other;

reuniting said signals after said optical paths;

in which at least one section of said optical paths is in common.

In particular, said process comprises the step of optically amplifying said signals at least once along said transmission line. Advantageously said step of selectively delaying said signals is immediately preceded and followed by the steps of optically amplifying said signals.

According to a third aspect, the present invention relates to an optical amplifier comprising:

a first and a second active optical fibres doped with a fluorescent dopant;

pumping means for said first and second active optical fibres, adapted to supply optical pumping power;

coupling means within said first active optical fibre for coupling said optical pumping power and at least two transmission signals, at different wavelengths, having respective coherence times;

an element for reducing the four wave mixing between said signals, which element is optically connected in series between said first and second active optical fibres, in which said FWM-reducing element comprises an optical circuit including optical paths of different lengths onto which said transmission signals are selectively sent, and said lengths are of such a value that at least two of the signals undergo a relative delay greater than the respective coherence times.

Preferably at least one section of said optical paths is in common with said signals.

In particular said fluorescent dopant is erbium and advantageously said active fibre comprises aluminium, germanium and lanthanum as the additional dopants.

BRIEF DESCRIPTION OF THE DRAWINGS

More details will become apparent from the following description, with reference to the accompanying drawings, in which:

FIG. 10 is a diagram of an optical circuit according to the invention for reduction of the optical noise resulting from FWM along a bidirectional optical communication line.

DESCRIPTION OF THE PREFERRED EMBODIMENTS

Figure 1:
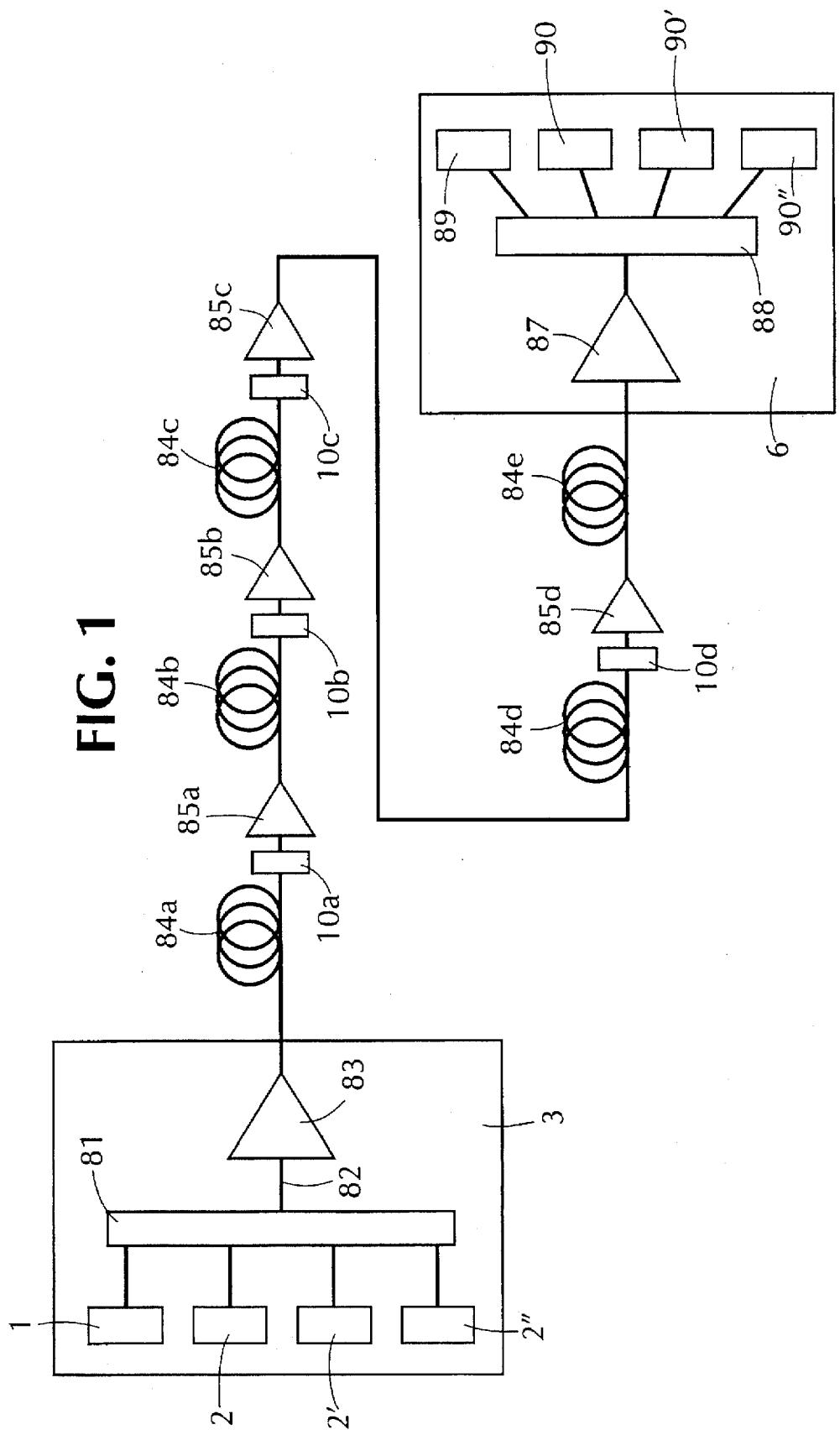
FIG. 1 is a diagram showing a wavelength division multiplexing optical communication system according to the invention.

A wavelength-division multiplexing optical telecommunication system will be now described with the aid of FIG. 1.

The present description refers to the case of a telecommunication system employing four independent communication channels having different wavelengths. However this particular case is utilized by way of example only. The following description is intended for application, when not otherwise specified, to the general case of any number of communication channels having different wavelengths.

The communication system in FIG. 1 comprises a transmission station 3 formed with optical-signal sources 1, 2, 2', 2", each of them having a different wavelength $\lambda_1$, $\lambda_2$, $\lambda_2'$, $\lambda_2''$, included in the useful work band of the amplifiers disposed in succession in the system, and a line width $\Delta v_1$, $\Delta v_2$, $\Delta v_2'$, $\Delta v_2''$.

The optical signals are fed to a signal combiner 81, adapted to simultaneously send the signals at the wavelengths $\lambda_1$, $\lambda_2$, $\lambda_2'$, $\lambda_2''$, over a single optical output fibre 82.

Generally, the signal combiner 81 is a passive optical device, by which the optical signals transmitted over respective optical fibres are superposed in a single fibre. Devices of this kind for example consist of fused-fibre couplers, in planar optics, microoptics and the like, available on the market.

Through fibre 82 the optical signals are sent to a booster 83 which raises the signal level until a value sufficient for the optical signals to travel over the next adjacent optical fibre portion extending before the new amplifying media, while keeping, at the end, a power level sufficient to ensure the required transmissive quality.

Connected to booster 83 is therefore one portion 84a of optical fibre usually consisting of an optical single-mode fibre of the step index type, fitted into an appropriate optical cable of a length of several tens (or hundreds) kilometers, for example about 100 km long.

Connected to the end of said first portion 84a of optical line is a first optical circuit 10a described in the following, which is adapted to reduce the optical noise resulting from intermodulation between the communication channels by effect of four wave mixing. The output of the optical circuit 10a terminates at a first line amplifier 85a, adapted to receive the signals attenuated during their travel on the fibre and to amplify them until a sufficient level for supplying them to a second optical fibre portion 84b having the same features as the preceding portion.

Subsequent circuits for optical-noise reduction 10b, 10c, 10d, line amplifiers 85b, 85c, 85d and optical fibre portions 84c, 84d, 84e cover the required overall transmission distance until a receiving station 6 comprising a pre-amplifier 87 adapted to receive the signals and to amplify them until a power level which is appropriate to the sensitivity of the receiving devices, compensating for the loss given by the subsequent demultiplexing apparatuses.

From preamplifier 87 the signals are sent to a demultiplexer 88, by which said signals are separated depending on the relative wavelengths, and then sent to the respective receiving apparatuses 89, 90, 90', 90".

The demultiplexer 88 is a device adapted to distribute over several output fibres, the optical signals fed to an input fibre, separating them depending on the respective wavelengths. This demultiplexer may consist of a fused-fibre divider, dividing the input signal into signals over several output fibres, each of said signals being fed to a respective band-pass filter, centered on each of the concerned wavelengths.

For example, a component similar to the already described signal combiner 81 may be used, which is mounted in opposite configuration and connected with respective band-pass filters.

Band-pass filters of the above type are for example commercialized by MICRON-OPTICS, INC., 2801 Buford Hwy, Suite 140, Atlanta, Ga., US. An appropriate model is FFP-100.

The described configuration gives particularly satisfactory results in transmissions over distances in the order of about 500 km, at high transmission speed, 2.5 Gbit/s for example (thereby achieving, with four multiplexed wavelengths, a transmission capacity corresponding to 10 Gbit/s over a single wavelength), through the use of four line amplifiers, one booster and one pre-amplifier.

To the ends of the present invention and for the above use, the booster 83 is for example a commercially-available optical fibre amplifier having the following features:

| input power | −13.5 to 3.5 dBm |
| output power | 12 to 14 dBm |
| work wavelength | 1534 to 1560 nm. |

The booster is devoid of a notch filter.

An appropriate model is TPA/E-MW available from the Applicant.

Said booster makes use of an erbium-doped active optical fibre, of the Al/Ge/Er type.

By booster it is intended an amplifier operating under saturation conditions, in which the output power depends on the pumping power, as described in detail in the European Patent EP 439,867, herein incorporated by reference.

To the ends of the present invention and for the above use, by pre-amplifier it is meant an amplifier put at the end of the line, capable of increasing the signal to be fed to the receiver to a value suitably higher than the sensitivity threshold of the receiver itself (from −26 to −11 dBm at the receiver input, for example), while at the same time introducing the lowest possible noise and maintaining the signal equalization.

For example, to make pre-amplifier 87, either a line amplifier using the same active fibre as line amplifiers 85a–85d described in the following may be used, or a pre-amplifier expressly designed for the purpose, based on specific requirements.

An appropriate model is RPA/E-MW, available from the Applicant.

The configuration of the above described transmission system is particularly appropriate to supply the desired performance, in particular for transmission over several WDM channels, if a particular selection of the properties of the line amplifiers being part thereof is carried out, in particular in connection with the capability of transmitting the selected wavelengths without some of them being penalized relative to the others.

In particular, a uniform behavior for all channels can be ensured, in the wavelength band included between 1530 and 1560 nm, in the presence of amplifiers adapted to operate in cascade, through the use of line amplifiers having a substantially uniform (or "flat") response to the several different wavelengths, in a cascade operation.

Figure 2:
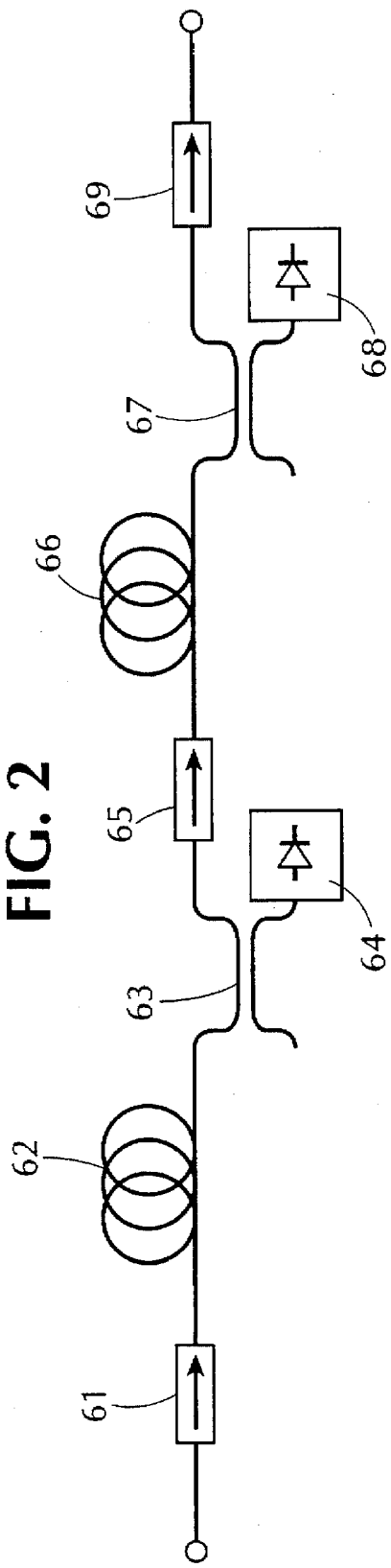
FIG. 2 is a diagram showing a two-stage optical line amplifier.

For the above purpose, an amplifier provided for use as a line amplifier has been made following the diagram shown in FIG. 2 and it comprises one erbium-doped active fibre 62 and a related pump laser 64 connected therewith by a dichroic coupler 63. One optical isolator 61 is located upstream of fibre 62, in the travelling direction of the signal to be amplified, whereas a second optical isolator 65 is located downstream of the active fibre itself.

Said amplifier further comprises a second erbium-doped active fibre 66 associated with a relevant pump laser 68 by a dichroic coupler 67. Then, a further optical isolator 69 is present downstream of fibre 66.

According to an alternative solution, not shown, the line amplifier can be also made in the form of a single-stage amplifier, based on the particular use requirements.

In a preferred embodiment, in the line amplifier of the above described type an erbium-doped active fibre is employed, as described in detail in the Italian Patent application No. MI94A000712 of Apr. 14, 1994 of the same assignee of this application, which is herein incorporated by reference and the contents of which are summarized herebelow.

One composition and the preferred optical features of the active fibres in the line amplifier are summarized in the following Table.

| $Al_2O_3$ wt % (mol %) | $GeO_2$ wt % (mol %) | $La_2O_3$ wt % (mol %) | $Er_2O_3$ wt % (mol %) | NA | $\lambda_c$ nm |
|---|---|---|---|---|---|
| 4 (2.6) | 18 (11.4) | 1 (0.2) | 0.2 (0.03) | 0.219 | 911 | wherein:
wt % = (average) percent content by weight of oxide in the core
mol % = (average) percent content by mole of oxide in the core
NA = Numerical Aperture $(n_1^2 - n_2^2)^{1/2}$
$\lambda_c$ = cut-off wavelength (LP11 cut-off).

Analyses of the compositions were made on a preform (before spinning of the fibre) by a microprobe combined with a scanning electron microscope (SEM HITACHI).

The analyses were conducted at 1300 magnification on discrete points disposed along a diameter and separated from each other by 200 μm. The stated fibres were made following the technique of the vacuum plating, within a quartz glass tube.

In the stated fibres, the incorporation of germanium as the dopant into the $SiO_2$ matrix in the fibre core is obtained during the synthesis step.

The incorporation of erbium, alumina and lanthanum into the fibre core was obtained by the "solution-doping" technique, in which an aqueous solution of the dopant chlorides is put into contact with the synthesis material of the fibre core, while it is in a particulate state, before consolidation of the preform.

More details on the "solution-doping" technique can be found for example in U.S. Pat. No. 5,282,079 which is herein incorporated by reference.

The pump lasers 64, 68 preferably are lasers of the Quantum Well type, having the following features:
emission wavelength $\lambda_p$=980 nm
maximum optical output power $P_u$=80 mW
Lasers of the above type are manufacture for example by
LASERTRON Inc., 37 North Avenue, Burlington, Mass. (USA).

The dichroic couplers 63, 67 are fused-fibre couplers, made of single-mode fibres at a wavelength of 980 nm and within the wavelength band included between 1530 and 1560 nm, with a variation <0.2 dB in the optical output power, depending on polarization.

Dichroic couplers of the above type are known and available on the market and are manufactured, for example, by GOULD Inc., Fibre Optic Division, Baymeadow Drive, Gelm Burnie, DM (US) and by SIFAM Ltd., Fibre Optic Division, Woodland Road, Torquay, Devon (GB).

The optical isolators 61, 65, 69 are optical isolators of a type independent of the polarization of the transmission signal, with an isolation greater than 35 dB and a reflectivity lower than −50 dB.

The isolators used are, for example model MDL I-15 PIPT-A- S/N 1016 available from ISOWAVE, 64 Harding Avenue, Dover, N.J. (US) or model PIFI 1550 IP02 available from E-TEK DYNAMICS Inc., 1885 Lundy Ave., San Jose, Calif. (US).

The described line amplifier is provided for operation at an optical overall (signals plus spontaneous emission) output power of about 14 dBm, with a gain for small signals of about 30 dB.

Under the provided operating conditions, the overall input power at the second stage preferably has a value of about 10 dBm, and the second stage operates under saturation conditions. The overall output power preferably varies by an amount lower than about 0.2 dBm for each dB variation of the overall input power at the second stage.

A device according to the present invention for reducing the optical noise due to four wave mixing will be now described with reference to FIG. 3.

The optical circuit 10 is comprised of an optical circulator 15 provided with three access ports, identified in the order by 11, 12, 13, an optical filter 16 having a selective reflection at the wavelength $\lambda_1$, connected to the optical circulator port 12 and a selective delay circuit at the wavelength $\lambda_2$ comprising a single mode optical fibre portion 18 one end of which is connected to the filter output 16 and an optical filter 19 having a selective reflection at the wavelength $\lambda_2$ and connected to the other end of the optical fibre portion 18. The single-mode optical fibre portion 18 has the same length as, or a greater length than half the maximum value $l_c$ between the coherence lengths $v/\Delta v_1$, $v/\Delta v_2$, $v/\Delta v_2'$, $v/\Delta v_2''$ of sources 1, 2, 2', 2" wherein v stands for the propagation velocity of the luminous radiation in the fibre.

By filter having a selective reflection at the wavelength $\lambda$ for one of the communication signals in a WDM communication system it is intended an optical component capable of reflecting a substantial fraction of the radiation at a wavelength included within a predetermined wavelength band and transmitting a substantial fraction of the radiation having a wavelength external of said predetermined band, wherein this predetermined wavelength band comprises said wavelength $\lambda$ and excludes the wavelengths of the other communication signals.

The optical circuit 10 further comprises the selective delay circuits 17', 17" each consisting of a single-mode optical fibre portion 18', 18" of the same length as, or a greater length than $L_c/2$, having one end connected to the output of the filter of the preceding selective delay circuit and the other end connected to an input of an optical filter 19', 19" having a selective reflection at the wavelength $\lambda_2'$, $\lambda_2''$.

The ports 11 and 13 of the optical circulator 15 are provided for connection along an optical-fibre communication line designed for optical signal transmission at the wavelengths $\lambda_1$, $\lambda_2$, $\lambda_2'$, $\lambda_2''$.

In particular, circuit 10 is provided for connection along a communication line with optical amplifiers in cascade, the line described with reference to FIG. 1 for example. In this case the ports 11 and 13 of the optical circulator 15 will be connected to the output of one of the optical fibres 84a–84d and the input of one of the line amplifiers 85a–85d, respectively.

The output of the last selective-reflection filter (the farthest one from the optical circulator) must be suitably terminated, so that spurious radiation reflections towards the optical circulator are avoided. For the purpose, one of the techniques known to a person having ordinary skill in the art can be adopted, such as a termination by an angled low-reflection connector 24. An appropriate connector is for example model FC/APC, manufactured by SEIKOH GIKEN, 296-1 Matsuhidai, Matsudo, Chiba (JP). If the optical circuit 10 is placed along a communication line with optical amplifiers in cascade, the termination may also consist of a dichroic coupler, adapted to separate the residual pump radiation of the amplifier connected upstream of circuit 10 from the spontaneous emission of the same amplifier, so that monitoring of the respective intensities can be carried out.

The optical connections between the different components of the optical circuit can be made by one of the known techniques, by butt-welding for example. The optical connections between the different selective delay circuits 17, 17', 17" can also be made by means of optical connectors, preferably of the low-reflection type, so that removal or addition of other selective delay circuits can be readily done.

Alternatively it is possible to accomplish the selective delay line, comprising the optical filter 16 and the selective delay circuits 17, 17', 17", along a single optical fibre portion, by making the filters 16, 19, 19', 19" spaced apart from each other a distance greater than $L_c/2$ along said single fibre portion, following techniques to be described in the following. The optical fibre portion is therefore connected to the port 12 of the optical circulator. This alternative solution has the advantage that it does not require optical connections between the different components of the selective delay line, so that the relevant attenuations are completely eliminated.

This selective delay line can be also made in a modular version, according to another alternative solution, by arranging a given number of selective-reflection filters along optical fibre portions, following the techniques described below, at mutual distances greater than $L_c/2$. Optical fibre portions of this type can be arranged for different wavelength and bandwidth combinations of the filters and can be either alternately connected to the port 12 of the optical connector or connected in series with each other, depending on the number and features of the channels intended for use in the communication system.

In each of the described versions, the arrangement order of the selective-reflection filters 16, 19, 19', 19" along the selective delay line is not critical for the present invention. This order can be modified during the accomplishment of said line.

The optical circulators are passive optical components generally provided with three or four ports disposed in an orderly sequence, unidirectionally transmitting the input radiation from each of the ports towards one alone of the other ports and more particularly towards the next adjacent port in the sequence. The circulators used are preferably of the type having a response independent of polarization. The optical circulators are commercially available components. Adapted for use in the present invention are for example model CR1500, manufactured by JDS FITEL Inc., 570 Heston Drive, Nepean, Ontario (CA) or model PIFC-100 manufactured by E-TEK DYNAMICS (already mentioned).

Selective-reflection filters adapted for use in the present invention are for example Bragg-grating waveguide filters. They reflect the radiation in a narrow wavelength band and transmit the radiation to the outside of this band. They consist of a portion of an optical waveguide, an optical fibre for example, along which the refractive index exhibits a periodic variation. If the signal portions reflected at each index change are in phase with each other, a constructive interference occurs and the incident signal is reflected. The constructive-interference condition, corresponding to the reflection maximum, is expressed by the relation $2 \cdot l = \lambda_s/n$, wherein l is the pitch of the grating formed by the refractive index variations, $\lambda_s$ is the wavelength of the incident radiation and n the refractive index of the optical waveguide core. The described phenomenon is described in the related literature as Bragg grating.

The periodic variation in the refractive index can be achieved by known techniques, for example by exposing an optical fibre portion devoid of the protective coating to the interference fringes formed by an intense UV beam (such as that generated by an excimer laser, a frequency-duplicated argon laser or a frequency-quadrupled Nd:YAG laser) which is caused to interfere with itself by an appropriate interferometer system, by a silicon phase mask for example, as described in U.S. Pat. No. 5,351,321. The fibre and in particular the core are thus exposed to a UV radiation of a periodically-varying intensity along the optical axis. In the core portions reached by the UV radiation a partial breaking of the GE-O bonds occurs which causes a permanent modification in the refractive index.

By selecting the grating pitch in such a manner that the constructive interference relation can be verified, the centre wavelength of the reflected band can be determined at will.

By this technique it is possible to produce filters having a wavelength band reflected at −3 dB typically of only 0.2 to 0.3 nm, reflectivity in the middle of the band until 99%, central wavelength of the reflected band susceptible of determination during the manufacturing step within about ±0.1 nm and variation of the central band wavelength at a temperature as low as 0.02 nm/°C.

Should the wavelengths of sources 1, 2, 2', 2" have a tolerance interval wider than 0.2 to 0.3 nm, filters having a pass-band of corresponding width are to be provided. For sources consisting of semiconductor lasers as currently used, for example, the emission wavelength is typically determined with a ±1 nm precision.

Bragg-grating optical fibre filters having the stated features can be made. The bandwidth in reflection can be made greater than 0.2÷0.3 nm by imposing a variable pitch to the grating, using techniques known for example from an article by P. C. Hill et al. published in Electronics Letters, vol. 30, No. 14, Jul. 7, 1994, pages 1172–1174.

Figure 3:
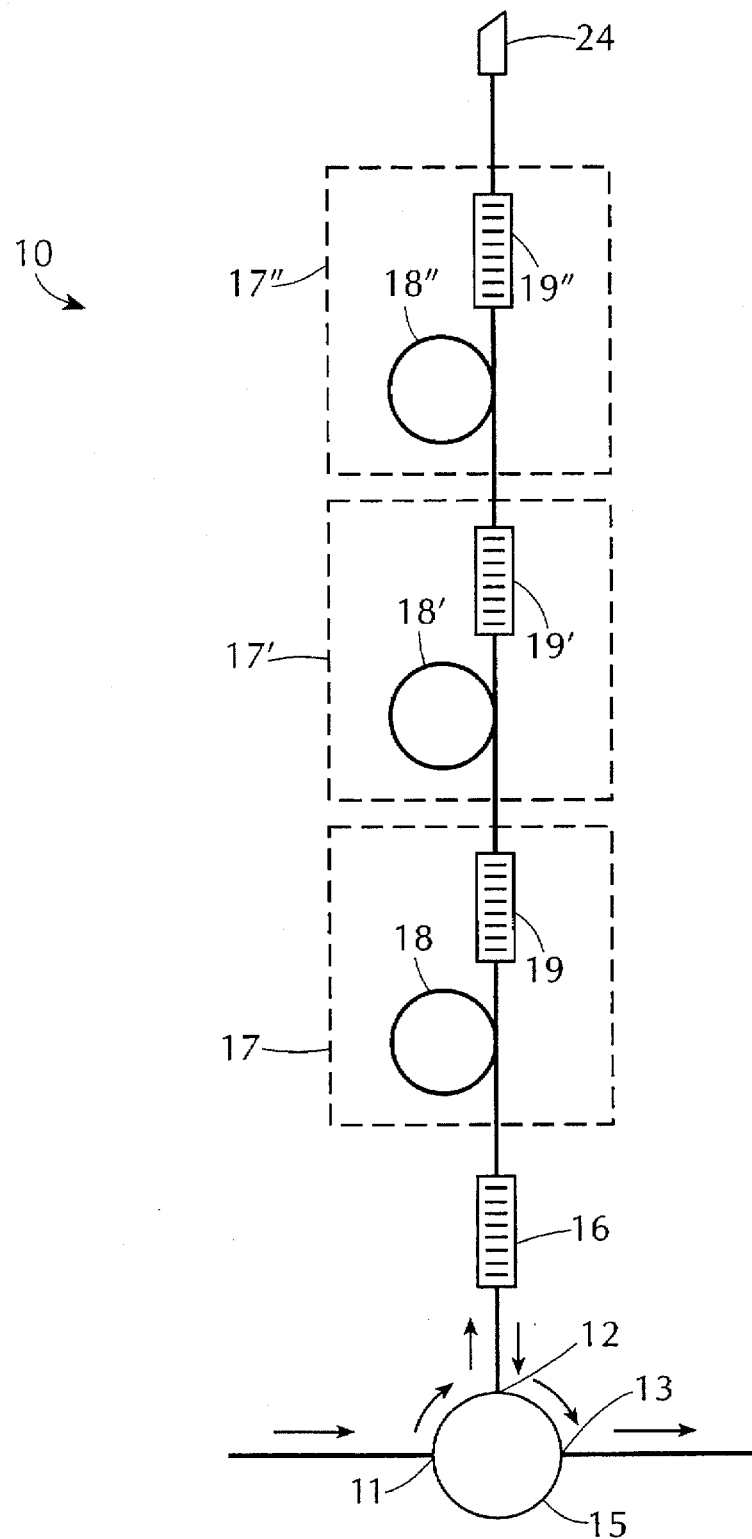
FIG. 3 is a diagram of an optical circuit according to the invention for reducing the optical noise resulting from FWM.

If the operating conditions in an optical communication line along which the device of FIG. 3 is employed make it necessary to compensate for the chromatic dispersion at the wavelengths of the communication signals, Bragg-grating optical fibre filters having a variable-pitch grating and made according to the characteristics known for example from an article by F. Ouellette published in Optics Letters, Vol. 12, No. 10, pages 847–849 of October 1987 can be used as the selective-reflection filters 16, 19, 19', 19".

If the use of the optical circuit 10 under conditions involving substantial temperature changes is provided, the optical fibre filters 16, 19, 19', 19" may need stabilization.

Operation of the device of FIG. 3 takes place in the following manner. The signals at the wavelengths $\lambda_1, \lambda_2, \lambda_2', \lambda_2''$ reach port 11 of the optical circulator 15 and propagate therefrom towards the circulator port 12. Then the signals reach the selective-reflection filter 16. The signal of wavelength $\lambda_1$ is reflected towards the circulator port 12 and propagate therefrom towards the circulator port 13. The radiations having a wavelength external of a narrow band centered on $\lambda_1$ (among these radiations being comprised the remaining signals at wavelengths $\lambda_2, \lambda_2', \lambda_2''$) are instead transmitted from filter 16 and reach, through the single-mode optical fibre portion 18, the selective-reflection filter 19 reflecting the radiation of wavelength $\lambda_2$, and transmitting the other signals. The signal at wavelength $\lambda_2$ comes back through fibre 18 and filter 16, to the optical circulator port 12 where it overlaps with the signal of wavelength $\lambda_1$. By effect of the double passage through the optical fibre portion 18, the signal of wavelength $\lambda_2$ is phase-uncorrelated from the signal of wavelength $\lambda_1$, that is phase-shifted by a length $I_c$ greater than the coherence length of sources 1 and 2. The signals at the other wavelengths $\lambda_2', \lambda_2''$ transmitted through the filter 19 and optical fibre portion 18' reach filter 19', by which the signal of wavelength $\lambda_2'$ is reflected. Then this signal comes back to the optical circulator port 12 phase-shifted by a length greater than $2 \cdot I_c$ with respect to the signal at a wavelength $\lambda_1$, and by a length greater than $I_c$ with respect to the signal at a wavelength $\lambda_2$, that is phase-shifted by a length greater than the coherence length with respect to each of the two signals and therefore phase-uncorrelated from both.

Finally the signal at a wavelength $\lambda_2''$ is reflected by filter 19". By effect of the double travel through the optical fibre portion 18", it overlaps with the other signals being phase-shifted by a length greater than the coherence length with respect to each of them and therefore phase-uncorrelated from them.

Finally the signals propagate from the optical circulator port 12 towards the circulator port 13 which is connected to the optical communication line as shown in FIG. 1.

The above description can be immediately extended to a greater number of signals of other wavelengths. The device can be easily arranged for operation with as many communication signals at different wavelengths as one likes, by connecting one selective delay circuit for each communication channel following the first one, according to any sequence.

This device can be readily modified even after its manufacture, so that it can be configurated again for the desired number of channels.

The above description of the device for reducing optical noise with reference to FIG. 3 relates to a preferential configuration of same in which said device comprises one selective-reflection filter for each of the communication signals transmitted therethrough.

In addition to this preferential configuration, the device can be made according to an alternative configuration in which only some of the communication channels are matched with selective-reflection filters separated from each other by single-mode optical fibre portions of a wavelength greater than half the maximum coherence length of the signals, whereas the remaining communication channels are reflected by one or more reflectors having a sufficiently wide wavelength band in reflection. This configuration enables some of the FWM signals generated upstream of the optical noise-reducing device to be phase-uncorrelated from the corresponding FWM signals generated downstream of the device.

Experiment

In order to verify the operation of the device for reducing optical noise, the Applicant, in the progress of an experiment, has compared an optical communication line according to the invention with an optical communication line of the traditional type.

The experimental configuration will be now described with reference to FIG. 4.

Two coherent optical sources were denoted by 31 ad 32. They are two tunable semiconductor lasers of the external-cavity type, model HP81678A manufactured by HEWLETT PACKARD Co., Rockwell, DM (US) and model TSL-80 manufactured by SANTEC, Micom Valley Tohkadai, Kamsue, Komaki, Aichi 485 (JP), respectively. The line width of these sources is about $\Delta v = 100$ KHz. By the relation $I_c = v/\pi\Delta v$, wherein v stands for the propagation velocity of the radiation along the fibre, value $I_c = 650$ m is obtained for the coherence length in the fibre of the employed sources.

The polarization of the produced signal from source 32 was aligned with the polarization of the produced signal from source 31 by a polarization-controlling device 33, located at the source 32 output and consisting of two elements swinging about an axis and formed of single-mode optical fibre coils with a diameter of about 20 to 40 mm. The two polarization-aligned signals were combined by a −3 dB coupler 34 and sent to a booster 35 model TPA/E-MW, as already mentioned and available from the Applicant.

The amplified signals were sent along the first stage of the transmission line consisting of the dispersion-shifted single-mode optical fibre 36 of a length $L_1 = 13.8$ km. The fibre has a zero dispersion in the vicinity of a 1543 nm wavelength, a slope of the dispersion curve of about 0.1 ps/(nm²·km) and an absorption of about 0.21 dB/km at the utilized wavelengths.

Circuit 20 for reducing optical noise was connected to the end of the optical fibre 36. It comprises an optical circulator 15, model CR1500, available from the already mentioned JDS FITE, connected through the port 11 to the optical fibre 36; a Bragg-grating optical fibre filter 16 connected to the port 12 of the optical circulator and having its maximum reflectivity at a wavelength of 1543.7 nm; a single-mode optical fibre 18 which is connected to the filter output 16 and is 460 m long, its length being therefore greater than half the coherence length (about 325 m in the case of the sources herein employed); a Bragg-grating optical fibre filter 19 connected to fibre 18 and conveniently selected with spectral features adjusted each time to the wavelengths of the signals in the progress of the experiment.

Figure 4:
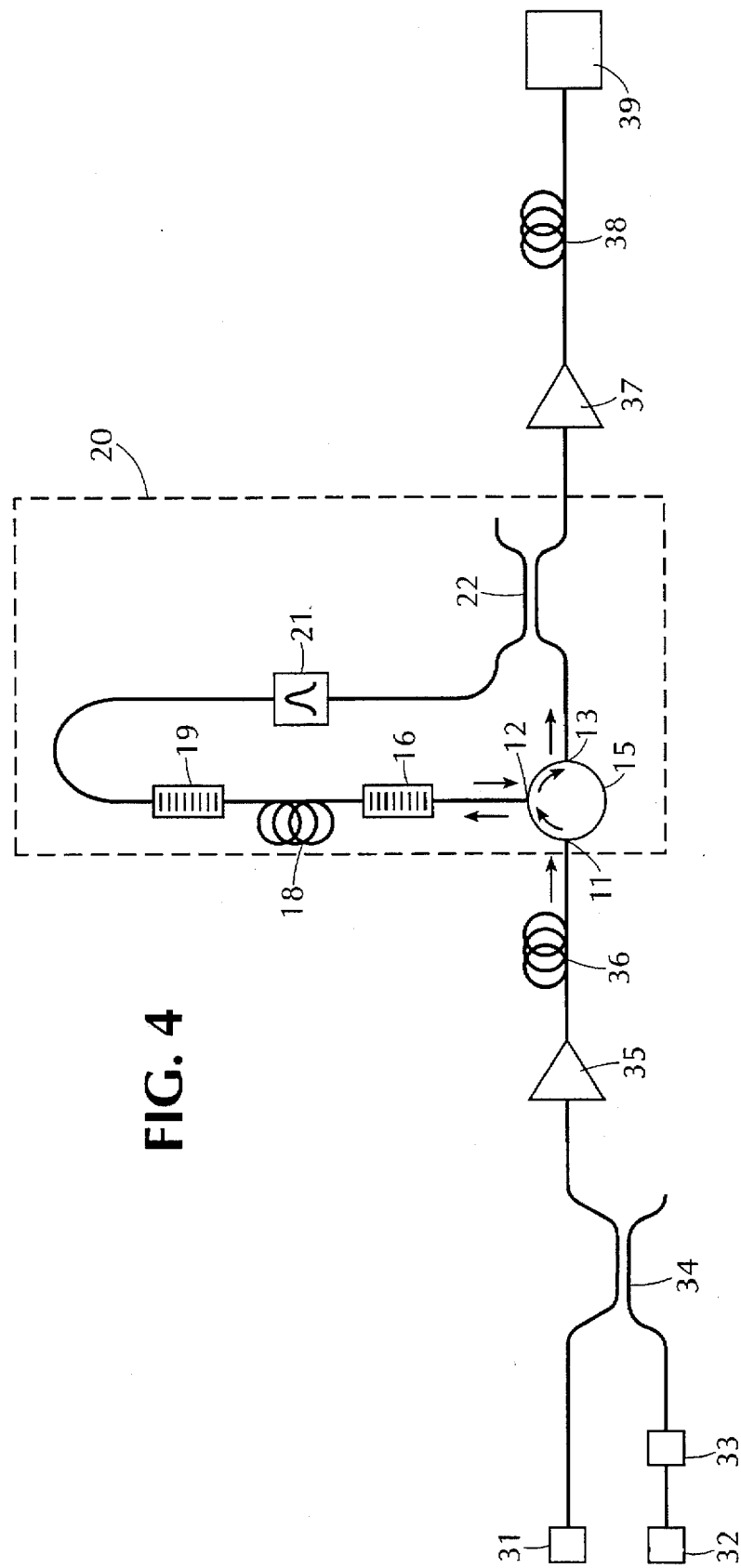
FIG. 4 is a diagram of an experiment to which a device according to the invention was submitted.
Figure 5:
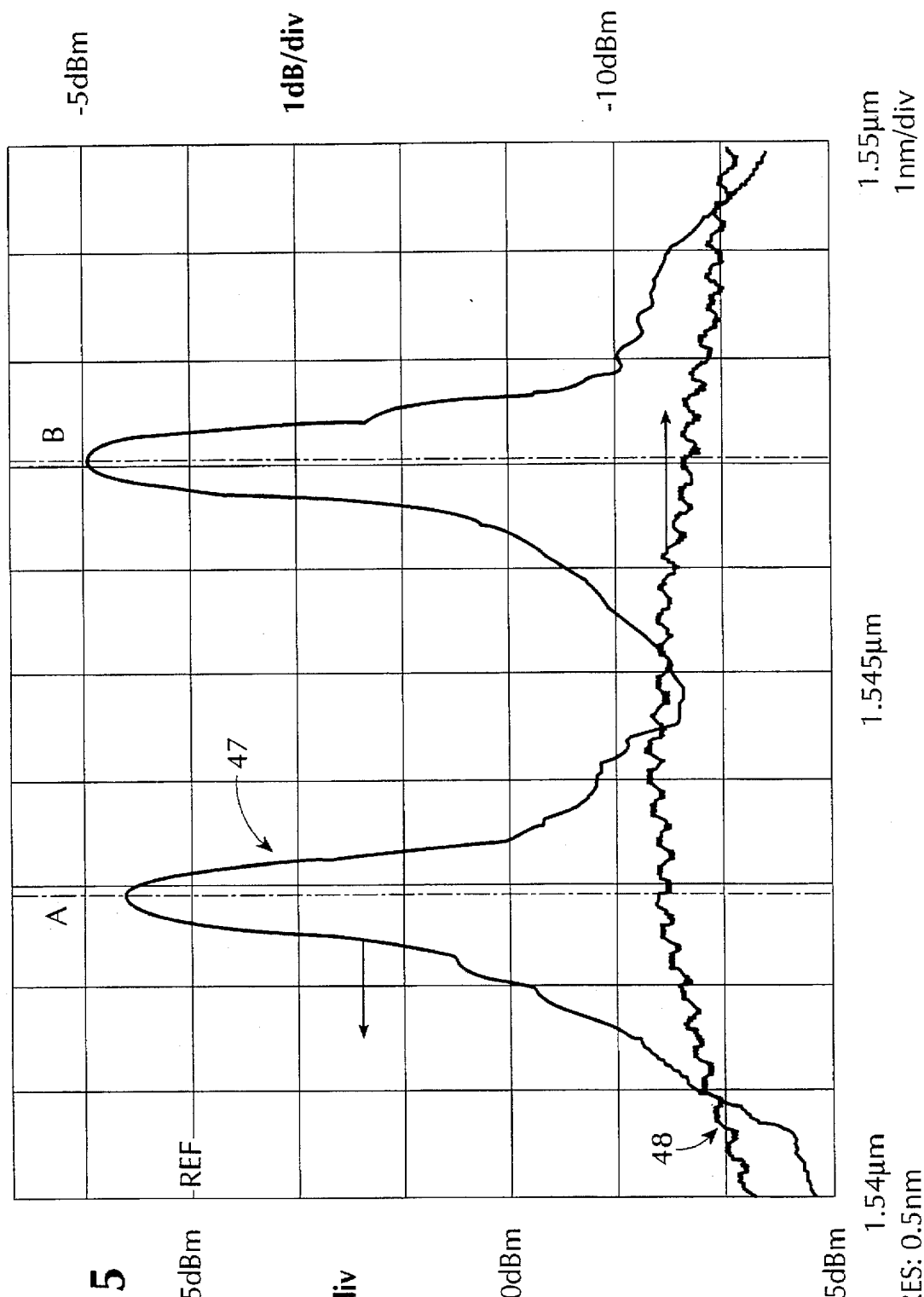
FIG. 5 is a spectral curve of the power transmitted through two optical-fibre filters connected in series with each other and of the Bragg-grating type, employed in the experimental device of FIG. 4.

FIG. 5 shows the spectral curve 47 of the power reflected by the described filter 16, connected in series with one of the filters 19 employed during the experiment. For this measurement the filters were connected, as in the experimental configuration of FIG. 4, to the central port of an optical circulator. Curve 47, referred to the scale to the left of the graph, reproduces the power measured at the output port of said optical circulator, while a signal of a spectral power reproduced in FIG. 5 by curve 48 (with reference to the scale to the left of the graph) was present at the input port of the circulator itself.

The optical circuit 20 further comprises a tunable interference filter 21, connected to the filter 19 output and such adjusted as to transmit the wavelength of the FWM-generated signal and to eliminate the components at the residual signal wavelengths after passage of the radiation through filters 16 and 19. Filter 21 was connected to an input of the −3 dB coupler 22, the other input of which was connected to the port 13 of the optical circulator 15. Connections between the optical components were made by butt-welding.

Through filter 21 and coupler 22, which are not present in the general diagram of the noise-reducing circuit 10 described with reference to FIG. 3, passage to the second stage of the communication line is allowed at the radiation produced by FWM in the first stage.

Passage of this radiation is allowed for the following reason. The experiment relates to the case of communication signals at two-wavelengths alone. Under these conditions the FWM-generated signal has a wavelength different from that of the two signals and the problem of its propagation along the communication line could have been eliminated by means of filters. This technique of filtering the FWM radiation, however, could not be used, as previously pointed out, in the more general case of a greater number of communication channels, in which the wavelengths of the FWM-generated signals can coincide with the wavelengths of the channels themselves and therefore would not be filtered. In order to be able to carry out an experiment with only two communication signals, which experiment is capable of verifying how the signals resulting from FWM in the two stages add up (this experiment being therefore significant also for the more general case) it is necessary to enable passage to the second stage of the radiation produced by FWM in the first stage. Filter 21 and coupler 22 have the above function.

Couplers at −2 dB, 22 and 34, are of the fused-fibre type, available from the already mentioned GOULD.

Following circuit 20 there was a line amplifier 37 and more particularly model OLA/E-MW, manufactured by the Applicant, which is based on an erbium-doped active fibre optically pumped at a wavelength of $\lambda_p$=980 nm. This line amplifier, at an overall power of the input channels of −20 dBm, has a gain of about 30 dB. The overall optical output power (signals plus amplified spontaneous emission) is on the contrary about 12 to 14 dBm.

The signals coming out of the line amplifier 37 were sent to the second stage of the transmission line consisting of a dispersion-shifted single-mode optical fibre 38 of a length $L_2$=5.1 km. The fibre has a zero dispersion at a wavelength of 1545 nm, a slope of the dispersion curve of about 0.1 ps/(nm$^2$·km) and an absorption at the utilized wavelengths of about 0.21 dB/km.

After propagation into the optical fibre 38, the signals were analyzed by an optical spectrum analyzer 39, model MS9030A/MS9701B, manufactured by ANRITSU Corp., 5-10-27 Minato-ku, Tokyo (JP).

Figure 6A:
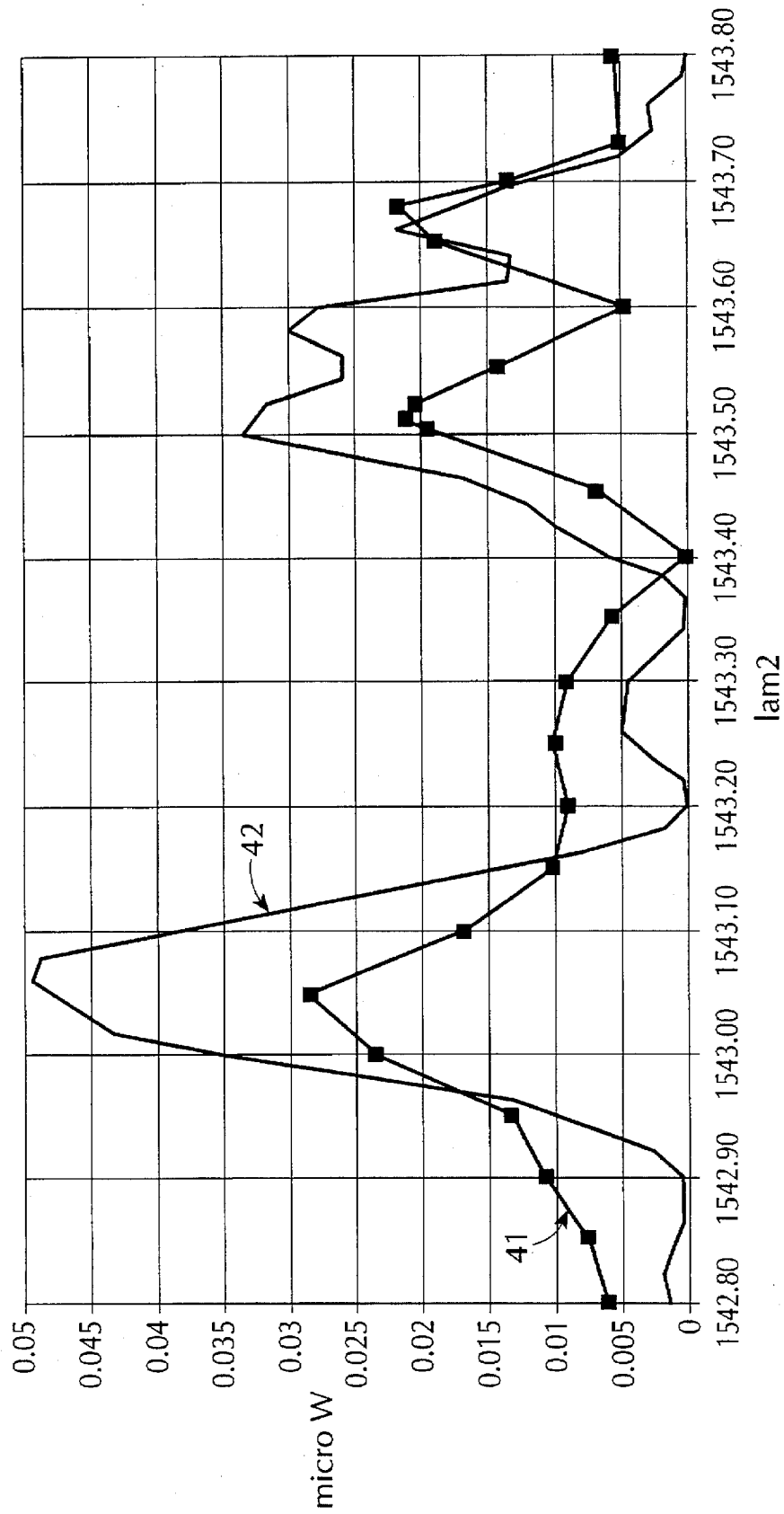
FIGS. 6A, 6B are graphs resulting from an experiment and a numerical simulation relative to the normalized power of the FWM signal generated in the presence of two communication signals, on varying of the wavelength of one of the signals, in the first (A) and second (B) stages of the experimental device of FIG. 4.
Figure 6B:
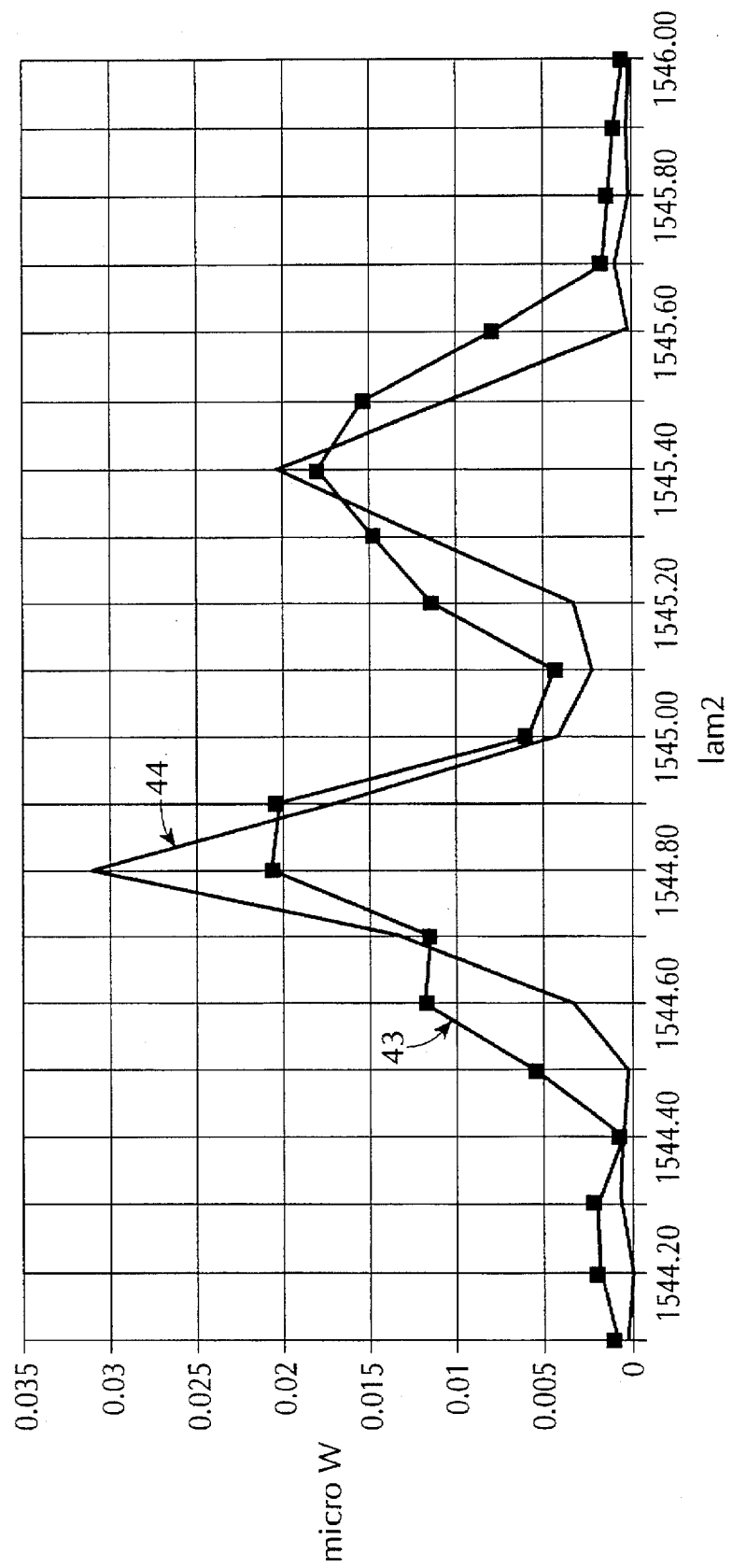

FIGS. 6A and 6B reproduce the power graphs of the FWM signal generated along the optical fibres 36 and 38 respectively, measured for a fixed wavelength of the source 31, on varying of the wavelength of source 32. For this measurement each of the two fibres was directly connected between a variable attenuator connected to the amplifier 35 output and the spectrum analyzer 39, temporarily excluding the other components of the optical circuit and sending a 2 to 4 mW power for each of the two channels to the fibre input. The power values in μW, reproduced in FIGS. 6A and 6B are however normalized with respect to input signals with a 1 mW (0 dBm) power per channel, according to the relation:

$$P_{FWM}(\text{norm}) = P_{FWM}/(P^{in}_{31} \cdot P^{in\,2}_{32}),$$

wherein $P^{in}_{31}$, $P^{in}_{32}$ are the power values of the optical input carriers. The polarization of the signal from source 32 was rotated by the device 33 until the FWM signal, measured at the fibre 36 output or fibre 38 output respectively was, made maximum.

For fibre 36 (FIG. 6A) the wavelength $\lambda_1$ for the optical source 31 was fixed to 1533.58 nm and measurements of the FWM-generated power were carried out varying the wavelength $\lambda_2$ of the optical source 32 between values of 1542.80 nm and 1543.80 nm, at a constant of about 0.05 nm. The measurement results are marked by filled squares in FIG. 6A, joined by line 41. Three peaks can be clearly seen at 1543.05 nm, 1543.51 nm and 1543.66 nm wavelengths. According to the Applicant's opinion, this can be explained by the fact that at the above wavelengths the dispersion value for fibre 36 used in the experiment is cancelled and the phase-concordance condition is verified.

A simulation based on a numerical pattern described by Journal of Lightwave Technology, vol. 10, No. 11, November 1992, pages 1553–1561 was conducted, considering the optical fibre 36 as formed of three DS fibre segments having a zero dispersion at the following wavelengths respectively: $\lambda_o1$=1543.05 nm, $\lambda_o2$=1543.51 nm and $\lambda_o3$=1543.66 n.

The other parameters introduced into the pattern for the three fibre segments were the following:

| | |
|---|---|
| attenuation | ∝ = 0.21 dB/km; |
| refractive index of glass | n = 1.45; |
| mode diameter | MFD = 8 μm; |
| nonlinear third-order susceptibility | $X_{111}$ = 4.26.10$^{14}$ m$^3$/J; |
| slope of the chromatic dispersion curve | Dc' = 0.1 ps/(nm$^2$ · km). |

The calculated normalized power of the intermodulation peaks $P_{FWM}$ at the signal wavelengths $X_1$=1533.58 nm and $\lambda_2$ included between 1542.80 nm and 1543.80 nm is represented in FIG. 6B by curve 4.

From a comparison between curves 41 and 42, one can see that, for the optical fibre 36, there is a profile of the FWM intermodulation peaks resulting from the pattern which is qualitatively quite similar to the one obtained experimentally. This makes one think that an optical fibre having dispersion features of the type assumed in the simulation represents a precise pattern of the actual optical fibre 36, in the examined wavelength band, in particular as regards the generation of FWM signals.

FIG. 6B reproduces the corresponding results relative to the optical fibre 38 employed in the second stage of the experimental device. Curve 43 joining the points of the experimental measurements, denotes the normalized power of the generated FWM signals starting from intermodulation between a signal of a wavelength $\lambda_1$=1534.84 and a signal of a wavelength $\lambda_2$ varying between 1544.10 nm and 1546.00 nm, with a constant of 0.1 nm. Two peaks are present at 1544.80 and 1545.40 nm wavelengths.

In this case too there is a good correspondence between the experimental curve 43 and curve 44, relative to a numerical simulation in which the optical fibre 38 was patterned as consisting of two fibre segments having a zero dispersion at the wavelengths $\lambda_o1$=1544.80 nm and $\lambda_o2$=1545.40 nm respectively and, for the other parameters, the same values as those used for the simulation relative to the optical fibre 36.

The data on the optical fibre 36 and 38 dispersion thus obtained was used for the subsequent numerical simulation of the overall behaviour of the device for reducing optical noise shown in FIG. 4. Data on simulation is compared with the experimental results in FIG. 7.

Figure 7:
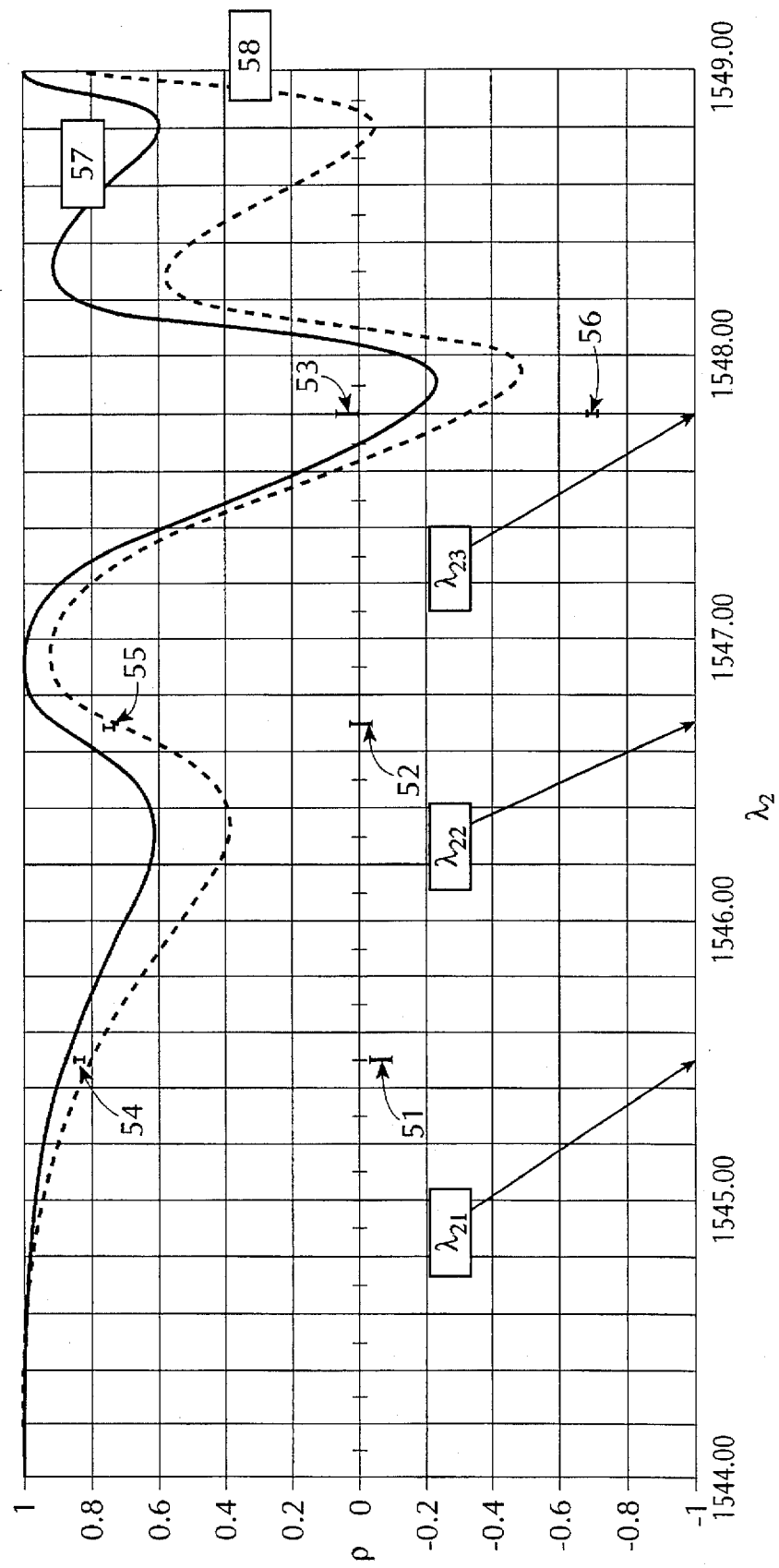
FIG. 7 is a graph showing the normalized power of the FWM signal measured during the above experiment, on varying of the wavelength of one of the transmitted channels, with and without the noise-reducing optical circuit, compared with a numerical simulation relative to the case of a communication line devoid of the noise-reducing optical circuit.

FIG. 7 reproduces the normalized powers $\rho$ of the FWM signals generated by intermodulation between a first signal, of wavelength $\lambda_1$=1533.7 nm and a second signal of wavelength $\lambda_2$ which can take different values. The obtained results are reproduced both in the absence and in the presence of circuit 20 of FIG. 4 for reducing optical noise.

The experiments were carried out for three values of the wavelength $\lambda_2$ of the second signal, $\lambda_{21}$=1545.50 nm, $\lambda_{22}$=1546.70 nm and $\lambda_{23}$=1547.80, respectively. Instead of filter 19 shown in the diagram of FIG. 4, an optical filter of the type previously described was connected by turns by butt-welding, which filter had a reflected wavelength band centered on the corresponding wavelength.

The numerical simulations were, on the contrary, carried out for values of $\lambda_2$ included between 1544 nm and 1549 nm.

On the X-axis of the graph in FIG. 7 the $\lambda_2$ value was indicated.

The values on the Y-axis, on the contrary, are those of the parameter $\rho$ corresponding to the normalized value of the difference between power $P_{FWM}(tot)$ (overall $P_{FWM}$ power) of the FWM signals measured at the device output and the sum of powers $P_{FWM}(1)$ and $P_{FWM}(2)$; the latter represent the powers measured at the second stage output, of the FWM signals generated separately along the first and second stage, that is along fibres 36 and 38 of the diagram in FIG. 4.

More particularly, parameter $\rho$ is given by the following expression:

$$\rho = \frac{P_{FWM}(tot) - (P_{FWM}(1) + P_{FWM}(2))}{2 \cdot \sqrt{P_{FWM}(1) \cdot P_{FWM}(2)}}$$

In order to estimate $\rho$ it was necessary to measure, for each wavelength $\lambda_2$ of the experiment, in addition to the overall power of the FWM signal coming out of the device, the powers coming out of the second stage of the FWM signals that would be independently generated along the first and second stages in the absence of interference.

The optical power $P_{FWM}(1)$ coming out of the device, of the FWM signal along the first stage can be directly measured, by temporarily connecting the spectral analyzer 39 to the amplifier 37 output or the second stage input, and dividing this value by the known attenuation value of fibre 38 constituting the second stage.

The optical power $P_{FWM}(2)$ of the signal resulting from FWM along the second stage is measured, in the presence of the optical noise-reducing circuit 20, by temporarily opening the optical connection between the filter 21 output and coupler 22, so as to prevent the FWM signal generated in the first stage from reaching the second stage, without modifying the channel power entering the second stage.

In the absence of the noise-reducing circuit 20, the optical power $P_{FWM}(2)$ is instead measured by temporarily replacing the optical fibre 36 of the first stage with an attenuator of a corresponding attenuation, so as to eliminate the generation of FWM signals without modifying the channel power entering the second stage.

Points 51, 52, 53 in the graph of FIG. 7 reproduce the experimental results for the three stated wavelengths $\lambda_{21}$, $\lambda_{22}$ and $\lambda_{23}$ relative to the case in which circuit 20 for reducing optical noise is present between the first and second stages of the device of FIG. 4.

It can be noticed that the parameter $\rho$ constantly takes a zero value.

The FWM-generated overall power corresponds, for each wavelength $\lambda_2$ of the second stage to the sum of the powers of the FWM signals generated in the two stages. Therefore any additional effect due to the interference between the two FWM signals generated in the individual stages is avoided.

In the absence of the noise-reducing circuit 20, that is by directly connecting the output of fibre 36 to the input of amplifier 37 in the device of FIG. 4, the above mentioned interference is on the contrary present, as confirmed by the measurements reproduced in the graph of FIG. 7 at points 54, 55, 56. In the two first cases the overall power of the FWM signal at the device output is greater than the sum of the powers of the FWM signals generated in the first and second stages, by about 80%.

In the case of measurement 56, relative to the the wavelength of the second signal $\lambda_2=\lambda_{23}$, the overall power of the FWM signal at the device output is lower than the sum of the powers of the FWM signals in the two stages. In this case the interference between the two FWM signals of the first and second stages is partially destructive and the connection of the optical circuit 20 for noise reduction makes the noise due to FWM higher than when circuit 20 is absent.

The contradiction however is only apparent, in that in general the signal wavelengths and the dispersion features of the optical transmission fibre cannot be determined in a precise manner. In general, as explained, it is not possible to be in the most favourable condition. It is always possible, on the contrary, that, due to indeterminacy or owing to even small variations in one of the parameters, a condition of positive interference between the FWM signals generated in the individual stages occurs.

In the present invention the occurrence of this unfavorable condition is avoided by limiting the power of the overall FWM signal to the sum of the powers generated in the individual amplification stages.

Curves 57 and 58 of the graph in FIG. 7 reproduce the results of the numerical simulations of the overall power of the FWM signals in the two-stage device devoid of a noise-reducing circuit.

For simulation of curve 57 the previously described patterns and related numerical parameters were used for the optical fibres 36 and 38 of the two stages of the device.

Curve 58, on the contrary, results from a numerical simulation in which, values being the same for all the other parameters, the following wavelengths for bringing dispersion to zero have been taken into account for the optical fibre 36 of the first stage:

$\lambda'_{o1}$=1543.1 nm $\lambda'_{o2}$=1543.6 nm and $\lambda'_{o3}$=1543.7 nm.

These values slightly diverge from the dispersion values employed in the first numerical simulation. The differences that can be seen between curves 57 and 58 show the high sensitivity of the interference between the FWM signals generated in the two stages at relatively small variations in the dispersion-cancelling values along the optical fibres. This high sensitivity together with the corresponding lack of precision used in making the dispersion features of the optical fibres known can explain, according to the Applicant's opinion, the imperfect coincidence between the experimental measurements (in particular measurement 56) and the results of the numerical simulation (curve 58).

The optical-noise-reducing circuit according to the present invention is particularly appropriate for use along a multistage optical communication line. In particular, it is appropriate for use in combination with an amplifier forseen as a line amplifier, for example in combination with the line amplifier described with reference to FIG. 2.

One of the possible arrangements is the one shown in FIG. 1, in which the optical-noise-reducing circuit is located downstream of the amplifier in the travel direction of the optical signals.

Figure 8:
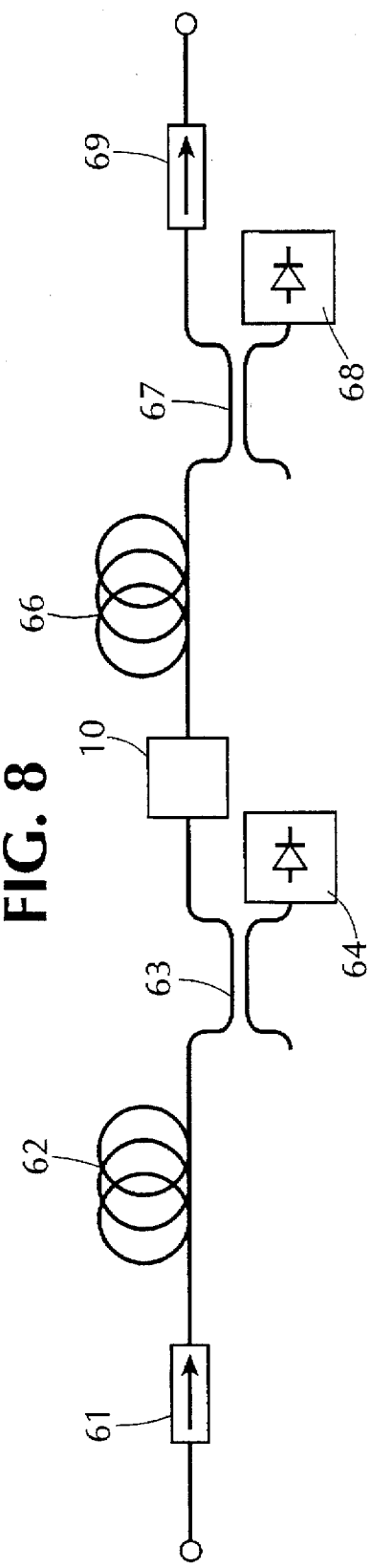
FIG. 8 shows the diagram of a two-pumping-stage line amplifier according to the invention comprising an optical circuit for reduction of the optical noise resulting from FWM.

A dual-pumping-stage line amplifier including a circuit for reducing the optical noise due to four wave mixing is reproduced in FIG. 8. Components corresponding to components of FIG. 2 already described have been allocated the same reference numerals.

Such an amplifier comprises one active fibre 62, doped with erbium, and a related pump laser 64, connected thereto through a dichroic coupler 63. A first optical isolator 61 is placed upstream of the active fibre 62, in the travel direction of the signal to be amplified, whereas one optical-noise-reducing circuit 10, already described with reference to FIG. 3, is placed downstream of the active fibre 62.

The optical circulator present within the optical circuit 10 inhibits propagation of back-reflected signals or optical noise of any kind, in an opposite direction relative to the communication signals.

The amplifier is further comprised of a second erbium-doped active fibre 66 associated with a related pump laser 68 through a dichroic coupler 67. Then, an optical isolator 69 is present downstream of fibre 66.

Features and typologies of the components corresponding to those present in the two-stage amplifier of FIG. 2 can be selected to advantage following the same modalities as in that case.

The lengths of the active fibres 62 and 66 of the two stages and the power emitted from the pump lasers 64 and 68 are preferably such selected that, for an overall input power (signals plus spontaneous emission) of about −16 dBm, the overall power inputted to the second stage is about 7 dBm and the overall output power from the second stage is about 13 dBm.

Positioning of the optical circuit 10 between the two stages of the amplifier enables the increase of the noise figure and losses due to connection of the optical circuit to be minimized. By virtue of the presence of a second stage under saturation conditions, in fact, the attenuation of circuit 10 is mostly compensated for, and the decrease in the overall output power of the amplifier as a result of the optical circuit connection is limited to about 1 dB.

In case of connection of the optical circuit 10 upstream or downstream of a line amplifier, it is possible to compensate for the attenuation resulting therefrom by the use, in series with the optical circuit itself, of a short portion of active fibre fed through a dichroic coupler by low-power pump radiation (supplied by a small semiconductor laser for example), so as to amplify the signals by an amount corresponding to the attenuation of the optical circuit 10.

Irrespective of how the optical circuit 10 is positioned relative to the line amplifier, said circuit has the advantage of filtering the spontaneous emission propagating along the optical communication line and possibly generated within the amplifier itself. The amplifier combined with the noise-reducing circuit, in fact, amplifies the communication signals and attenuates the radiation at the other wavelengths external to the reflected bands of the filters present in circuit 10.

Figure 9:
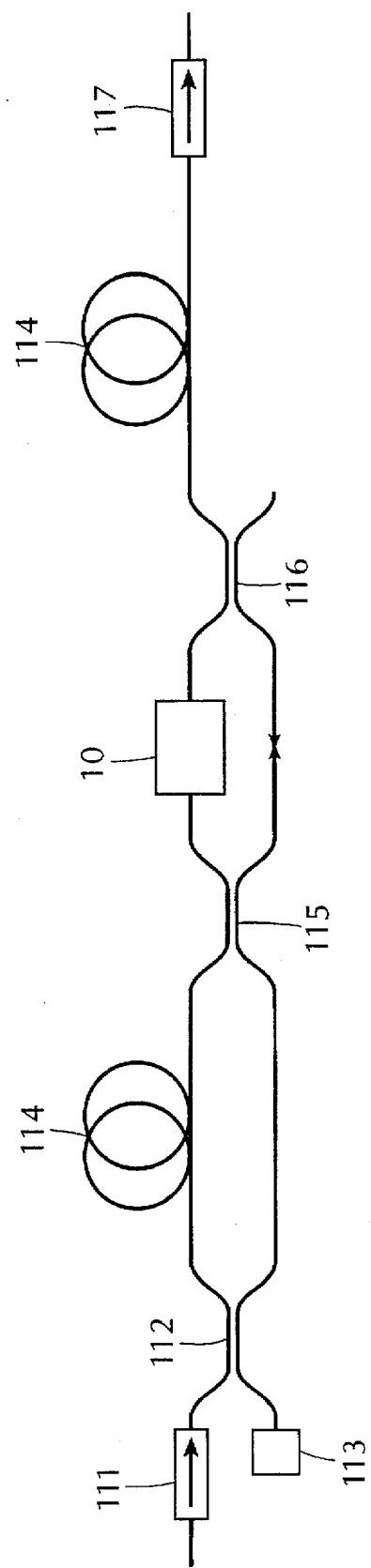
FIG. 9 is a diagram of a single-pumping-stage line amplifier according to the invention comprising an optical circuit for reducing the optical noise resulting from FWM.

Alternatively to the description in connection with FIG. 8, the line amplifier can be also made in a single pump stage configuration, based on the particular use requirements. In this case too a circuit for reducing the optical noise from FWM can be combined to advantage with the amplifier. In the configuration shown in FIG. 9, a circuit 10 of the same type as described with reference to FIG. 3 is connected along the optical fibre 114 of the amplifier. The communication signals, transmitted through an optical isolator 111, are combined by a dichroic coupler 112 with the pumping radiation from source 113. In an intermediate position along the active fibre 114, an appropriate by-pass for the pump is made, by the dichroic couplers 115 and 116, whereas the radiation in the signals' wavelength band is sent through the optical circuit 10. A second optical isolator 117 is put at the end of the active fibre 114.

The optical-noise-reducing circuit 10 described with reference to FIG. 3 enables the uncorrelation of the FWM signals generated in the different stages of an optical communication line by intermodulation between the communication signals propagating in a given direction along the line itself.

FIG. 10 shows an optical-noise-reducing circuit 10' in a bidirectional optical WDM communication system according to an alternative version of the present invention.

Circuit 10' is provided for connection along a bidirectional optical communication line, in particular along a communication line comprising passive optical fibre portions alternated with bidirectional optical amplifiers.

The circuit shown in FIG. 10 is provided for the case of four communication channels in each direction. The device shown can be however adjusted, in the same manner as the monodirectional circuit of FIG. 3, depending on the number of channels actually employed for transmission in each direction.

The optical circuit 10' comprises an optical circulator 15', provided with four access ports, identified in the order by 11, 12, 13, 14.

Circuit 10' will be now shown with reference to the case of four optical signals coming from the portion of the communication line connected to the optical circulator port 11 of wavelengths $\lambda_1$, $\lambda_2$, $\lambda_2'$, $\lambda_2''$, respectively, and four other optical signals coming from the portion of the communication line connected to the optical circulator port 13 of wavelengths $\lambda_7$, $\lambda_8$, $\lambda_8'$, $\lambda_8''$ respectively, The line widths of the signals are denoted by $\Delta v_1$, $\Delta v_2$, $\Delta v_2'$, $\Delta v_2''$, $\Delta v_7$, $\Delta v_8$, $\Delta v_8'$, $\Delta v_8''$ respectively.

Connected to the port 12 of the optical circulator 15' is an optical filter 16 having a selective reflection at the wavelength $\lambda_1$. Connected to the optical filter 16 is a selective delay circuit 17 at the wavelength $\lambda_2$ and comprising a single-mode optical fibre portion 18 one end of which is connected to the filter 16 output and the other end of which is connected to the optical filter 19, having a selective reflection at the wavelength $\lambda_2$. The single-mode optical fibre portion 18 is as long as, or longer than half the maximum value $I_c$ between the coherence lengths $v/\pi\Delta v_1$, $v/\pi\Delta v_2$, $v/\pi\Delta v_2'$, $v/\pi\Delta v_2''$, $v/\pi\Delta v_7$, $v/\pi\Delta v_8$, $v/\pi\Delta v_8'$, $v/\pi\Delta v_8''$ of sources 1, 2, 2', 2", 7, 8, 8', 8" (not shown in FIG. 10) in the optical fibre, wherein v is the propagation velocity of the light radiation in the fibre.

Connected to the port 14 of the optical circulator 15' is an optical filter 76 having a selective reflection at the wavelength $\lambda_7$. Connected to the optical filter 76 is a selective delay circuit 77 at the wavelength $\lambda_8$, comprising a single-mode optical fibre portion 78 one end of which is connected to the filter 76 output and the other end of which is connected to an optical filter 79 having a selective reflection at the wavelength $\lambda_8$. The single-mode optical fibre portion 78 is as long as, or longer than $L_c/2$.

The optical circuit 10' is comprised of other selective delay circuits 17', 17", 77', 77", each consisting of a single-mode optical fibre portion 18', 18", 78', 78" as long as, or longer than $L_c/2$ and having one end connected to the filter output of the preceding selective delay circuit and the other end connected to an input of an optical filter 19', 19", 79', 79" having a selective reflection at the wavelength $\lambda_2'$, $\lambda_2"$, $\lambda_8'$, $\lambda_8"$.

Ports 11 and 13 of the optical circulator 15' are provided for connectionn along the communication line, preferably close to the bidirectional optical amplifiers.

For signals of a wavelength $\lambda_1$, $\lambda_2$, $\lambda_2'$, $\lambda_2"$, coming from the communication line portion connected to the optical circulator port 11, operation of the circuit is the same as that of circuit 10 in FIG. 3 and reference is made to the previous description.

The path of travel of the signals at a wavelength $\lambda_7$, $\lambda_8$, $\lambda_8'$, $\lambda_8"$ coming from the communication line portion connected to the optical circulator port 13, comprises exiting from the optical circulator port 14, coming back to the same port after reflection by the filter 76 or the selective delay circuits 77, 77', 77" respectively, and exiting from the optical circulator port 11. On the contrary, the signals having wavelengths external of the reflected band of filters 76, 79, 79', 79" exit from the optical circuit 10' through termination 24.

Through this circuit the interference between the FWM signals generated in both directions along the communication line is limited.

I claim:

1. An optical telecommunication system comprising:
   at least two sources of optical signals modulated at different wavelengths and having respective coherence times;
   a multiplexer for multiplexing said signals in a single common optical fibre;
   an optical fibre line connected at one end to said common optical fibre of said multiplexer;
   means for receiving said signals connected to a second end of said optical fibre line and including a demultiplexer for said optical signals; and
   means for reducing four wave mixing between said signals, wherein the means is optically connected in series along said optical fibre line and comprises an optical circuit including at least two wavelength-selective filters having a wavelength band including one of said respective optical signals, said filters being optically connected in series with each other over an optical path, and wherein at least one section of said optical path included between said two consecutive filters has a length greater than the length corresponding to the coherence time of at least one of said sources of optical signals.

2. An optical telecommunication system according to claim 1, wherein said optical circuit, for each of said optical signals, comprises wavelength-selective filters each having a wavelength band for one of the optical signals and wherein the wavelength band excludes optical signals other than the wavelength band for the one of the optical signals, said filters being optically connected in series with each other over an optical path, the length of the sections of said optical path included between the two consecutive filters being greater than the length corresponding to the coherence time of each of said sources of optical signals.

3. An optical telecommunication system according to claim 1, wherein said optical circuit comprises an optical circulator having an input port and an output port connected with said optical fibre line and at least one input/output port connected to one of said wavelength-selective filters.

4. An optical telecommunication system according to claim 1, wherein said wavelength-selective filters are Bragg-grating filters.

5. An optical telecommunication system according to claim 4, wherein said Bragg-grating filters are made of optical fibre.

6. An optical telecommunication system according to claim 1, comprising at least one optical amplifier disposed along said optical fibre line.

7. An optical telecommunication system according to claim 6, wherein said optical amplifier comprises one active optical fibre doped with a fluorescent dopant and a source of pump radiation.

8. An optical telecommunication system according to claim 7, wherein said fluorescent dopant is erbium.

9. An optical telecommunication system according to claim 7, wherein the four wave mixing reducing means is optically connected in series at an intermediate position along said active optical fibre.

10. An optical telecommunication system according to claim 9, comprising an optical travel path for the pumping radiation external of said four wave mixing reducing means provided between the two portions into which said active optical fibre is divided by said four wave mixing means.

11. An optical telecommunication system according to claim 9, wherein said optical amplifier comprises two active optical fibre portions, wherein each portion includes a source of pump radiation.

12. An optical telecommunication system according to claim 9, wherein the lengths of said active optical fibre portions, the fluorescent-dopant concentration in the active optical fibre and the pumping-source power are operatively selected in such a manner that the overall gain of said amplifier differs by less than 2 dB from the gain of the same amplifier without said four wave mixing reducing means, so that the optical continuity between the two active optical fibre portions is restored.

13. A process for transmitting optical signals comprising:
   generating two modulated optical signals having respective wavelengths;
   multiplexing said signals at one end of an optical transmission line, wherein the line comprises at least one single-mode optical fibre portion within which intermodulation by four wave mixing between the signals is generated;
   receiving said signals at a second end of said optical transmission line;
   selectively delaying said signals at an intermediate position along said optical transmission line between the first and second end, wherein said selective-delaying comprises:
   selectively sending said signals to respective optical paths of predetermined lengths connected in series, wherein said lengths are adapted to phase-uncorrelate said signals from each other; and combining said signals sent to said optical paths, wherein at least one section of each of said optical paths is common to all of said optical paths.

14. A process for transmitting optical signals according to claim 13 comprising the step of optically amplifying said signals at least once along said transmission line.

15. A process for transmitting optical signals according to claim 14, wherein said step of selectively delaying said signals is immediately preceded and followed by the step of optically amplifying said signals.

16. An optical amplifier comprising:

a first and a second active optical fibres doped with a fluorescent dopant;

pumping means for said first and second active optical fibres adapted to supply optical pumping power;

coupling means within said first active optical fibre for coupling said optical pumping power and at least two transmission signals having different wavelengths and coherence times;

a means for reducing four wave mixing between said signals, wherein the four wave mixing reducing means is optically connected in series between said first and second active optical fibres and comprises an optical circuit including optical paths of different length onto which said transmission signals are selectively sent, wherein said lengths are of such a value that at least two of the signals undergo a relative delay greater than the respective coherence times.

17. An optical amplifier according to claim 16, wherein at least one section of each of said optical paths is a common path and wherein all of said signals are selectively sent on the common path.

18. An optical amplifier according to claim 16, wherein said fluorescent dopant is erbium.

19. An optical amplifier according to claim 18, wherein at least one of said active fibres comprises aluminum, germanium and lanthanum as the additional dopants.

* * * * *